United States Patent
Mann et al.

[11] Patent Number: 5,621,458
[45] Date of Patent: Apr. 15, 1997

[54] AUDIO AND VIDEO DOCKING AND CONTROL SYSTEM

[75] Inventors: Timothy C. Mann, Morristown; John H. Stevens, Martinsville, both of Ind.

[73] Assignee: Thomson Consumer Electronics Inc., Indianapolis, Ind.

[21] Appl. No.: 326,881

[22] Filed: Oct. 21, 1994

[30]     Foreign Application Priority Data

Nov. 23, 1993  [GB]  United Kingdom ............... 9324051

[51] Int. Cl.⁶ ............................................. H04N 5/225
[52] U.S. Cl. ....................... 348/232; 348/233; 348/222; 368/10; 368/41; 368/43
[58] Field of Search .......................... 348/207, 222, 348/233, 232, 563, 569, 730, 5, 7, 213; 340/309.15; 368/41–43, 10; 358/335; 320/1, 11, 2, 14; H04N 5/225

[56]             References Cited

U.S. PATENT DOCUMENTS

| | | | |
|---|---|---|---|
| 4,567,557 | 1/1986 | Burns | 364/145 |
| 4,715,010 | 12/1987 | Inoue et al. | 368/43 |
| 4,774,697 | 9/1988 | Aihara | 368/41 |
| 4,833,618 | 5/1989 | Verma et al. | 364/483 |
| 4,849,682 | 7/1989 | Bauer et al. | 320/15 |
| 4,852,030 | 7/1989 | Munday | 364/569 |
| 4,868,800 | 9/1989 | Arber | 368/43 |
| 5,013,972 | 5/1991 | Malkieli et al. | 315/209 |
| 5,057,383 | 10/1991 | Sokira | 492/92 |
| 5,199,009 | 3/1993 | Svast | 368/240 |
| 5,214,622 | 5/1993 | Nemoto et al. | 368/10 |
| 5,220,540 | 6/1993 | Nishida et al. | 368/41 |
| 5,285,963 | 2/1994 | Wakefield et al. | 237/2 A |
| 5,287,109 | 2/1994 | Hesse | 340/309.15 |

FOREIGN PATENT DOCUMENTS 304078  10/1992  Japan ............................ H04N 5/225

OTHER PUBLICATIONS

Application Serial No. 326,882, T.C. Mann et al.

*Primary Examiner*—Glenton B. Burgess
*Attorney, Agent, or Firm*—Joseph S. Tripoli; Joseph J. Laks; Francis A. Davenport

[57]             ABSTRACT

A docking and control apparatus for portable electronic entertainment devices comprises a power supply for generating a battery eliminating current. A plurality of calendars are stored in memory and are user selectable. An algorithm combines the selection to form a custom calendar. The algorithm also combines user specific event dates, names and control functions to produce a consolidated calendar. The control functions may include choices of message displayed upon event occurrence, and devices and functions to be triggered at event occurrence. The time of activation within the event day may be specified. The user may generate a specific message which may be stored for recall. The algorithm anticipates event occurrence and generates appropriate advisory messages. A microprocessor maintains a real time clock calendar and executes a calendar algorithm. Upon the occurrence of a consolidated calendar event date, and if specified at a time within the event day, the microprocessor generates a control signal specific to the control function stored with the event. The control signal may generate a message from a plurality stored in memory, or may recall a user generated message. The control signal may initiate operation of a device coupled to the docking apparatus. The microprocessor control functions may be manually initiated. The microprocessor also produces a status message display. Message data read from memory is formatted to generate a video signal for video monitor display. The video signal is also coupled to an RF modulator for TV receiver display.

14 Claims, 7 Drawing Sheets

AUDIO AND VIDEO DOCKING AND CONTROL SYSTEM

This invention relates to the field of portable consumer electronic devices and in particular to a docking apparatus employing a microcomputer.

BACKGROUND OF THE INVENTION

Users of portable audio or video equipment, for example CD players or camcorders, may experience inconvenience and difficulty when attempting to couple such portable device for use in a fixed installation, for example, connection to a high fidelity sound system or TV receiver or monitor. Often a proliferation of other equipment must be connected together to enable the mating of fixed and portable entertainment equipment. For example, to view the video output from a camcorder may require an AC powered battery eliminator, and for TV viewing, a separate RF modulator is needed. In addition, the RF modulator output cable must be connected to replace the TV antenna cable. Similarly a portable CD player may require AC powered battery elimination, with the audio outputs coupled, for example, to a high fidelity sound system or a wireless headphone transmitter.

In addition to multiple signal and power interconnections the host or fixed equipment must be controlled by the prospective user to accept the external input, for example the host device must be activated and the appropriate input signal selected. The use of microprocessors for control is known, however the cost of memory now permits the storage of automated control sequences and the generation of messages for display.

The user of portable audio or video equipment is desirous of a docking apparatus which powers the device from an AC supply thus eliminating the need for batteries, provides a simple, compact and permanently connection capability and a simple method of automated control.

SUMMARY OF THE INVENTION

A calendar controlled display apparatus comprises a video display and memory. The memory comprises a first calendar preprogrammed with a first specific event, and a second calendar preprogrammed with a second specific event. An algorithm combines selections from the first and second calendar to form a custom calendar. A microprocessor executes the algorithm and generates a first control signal upon an occurrence of an event from the custom calendar. The first control signal is coupled to control the video display.

DETAILED DESCRIPTION

Figure 1:
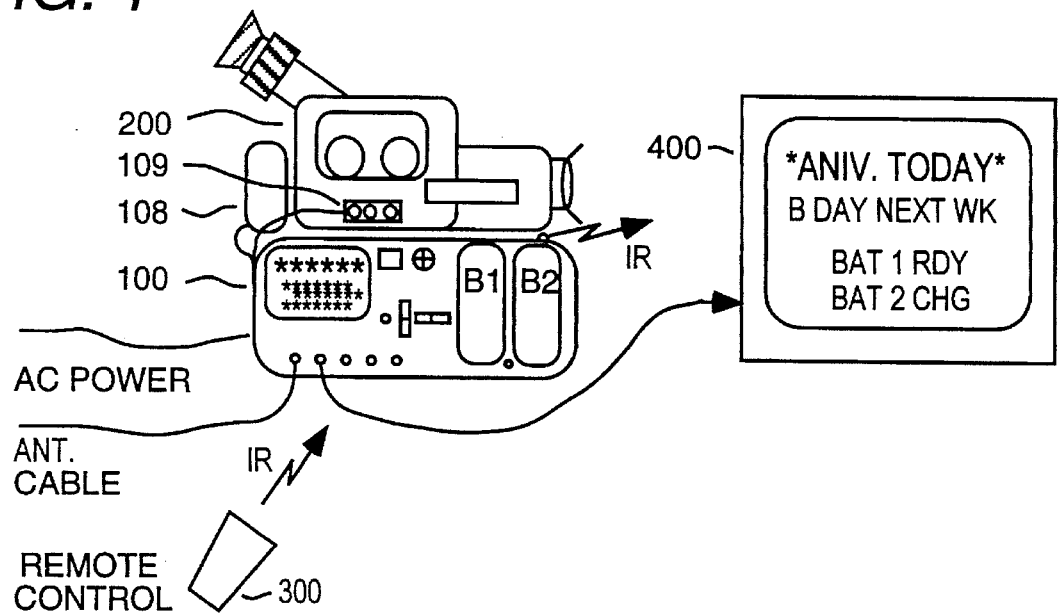
FIG. 1 shows a camcorder docking and control system according to an inventive arrangement.

FIG. 1 illustrates an inventive docking system incorporating an inventive control and coupling apparatus including a power supply for battery charging/rejuvenation and battery elimination. A camcorder is shown mated with appropriate connectors of the docking unit. The docking connectors provide DC to power the camcorder, audio and video output connection for coupling to suitable monitoring devices. A universal connector may be used for camera mounted battery charging and to provide audio and video output connections. The docking unit is AC powered and comprises the various control and display sub-systems shown in the blocks of FIG. 3. In addition the docking unit provides charging and conditioning of, for example, two batteries. The unit also provides connection capability to a display device at base band, via video and audio inputs, or at radio frequency (RF) via an RF modulator. The RF modulator output is coupled to an active antenna loop-through which permits a permanent T.V. antenna connection and facilitates camcorder viewing without changing antenna cabling at the TV receiver. The inventive system shown in FIG. 1 may be controlled by manually operated front panel switches or via a remote control unit, for example, a hand held IR controller. The status of the docking unit is displayed on a display panel with control functions selected from a menu based display with prompting. The status is also provided as a base band video signal for monitor display and as a modulated RF signal for TV receiver usage. In addition to displaying docking unit status, the camcorder audio and video may be selected to feed the baseband and RF signal outputs. The hand held IR controller may control the docking unit and camcorder via a direct docking connection, or control may be provided to each component via an IR transmitter which forms part of the docking unit.

Figure 3:
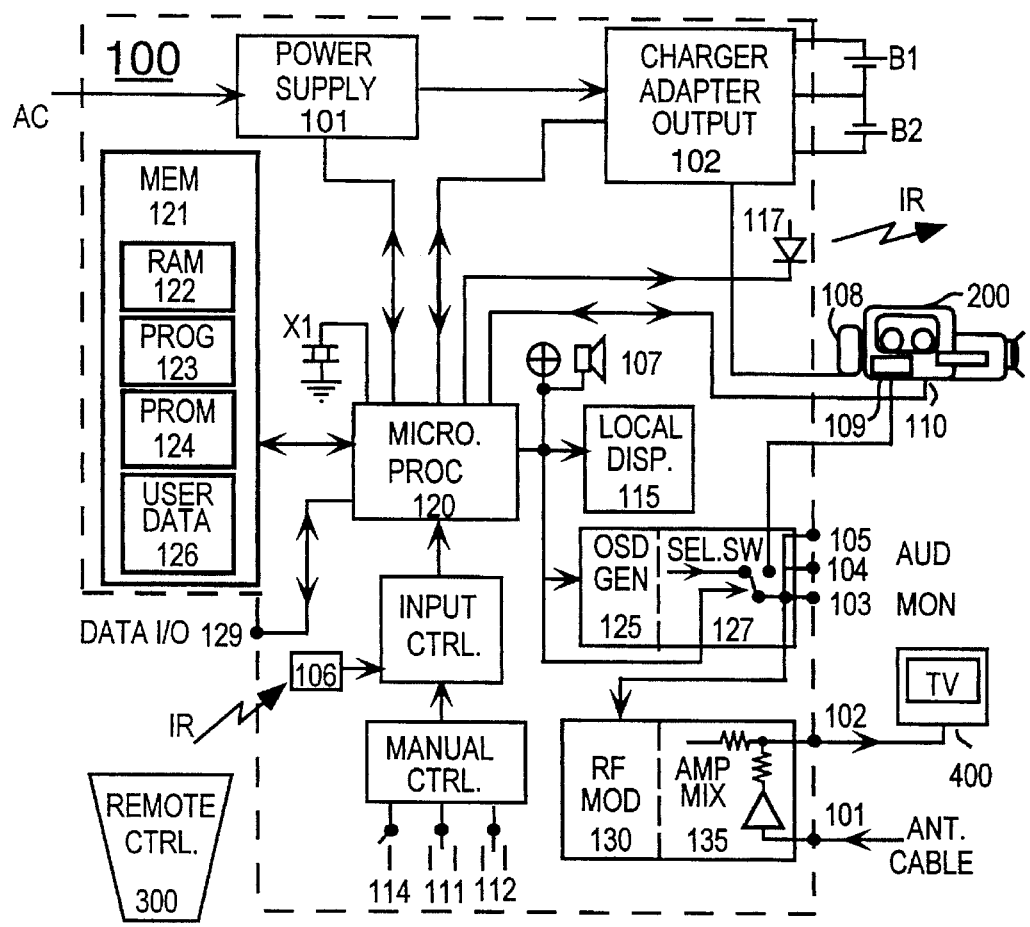
FIG. 3 is a block diagram of the inventive coupling and control system of FIG. 1.

The inventive control and docking unit 100 shown in FIG. 3 comprises a power supply 101 which converts AC power into various DC supplies for battery charging, camcorder power, and in internal circuit power. One or more batteries of the same type may be demounted from the camcorder and plugged into connectors B1 or B2 for charging. A DC supply is also available via connector 108 which connects to the camcorder in place of a battery. A suitably equipped camcorder may be powered by the adapter via interface connector 110. Interface connector 110 may also provide charging current for a camcorder with battery attached.

A microprocessor 120 is utilized for control and monitoring of the inventive docking and control system. Microprocessor 120 is coupled to the power supply, charger output, the camcorder, memory 121, local display 115 and an on-screen-display (OSD) generator 125. An illuminated indicator and acoustic sounder 107 are driven by an output from microprocessor 120. The microprocessor may remotely control external equipment by means of IR transmitter 117, which for example, may control TV receiver 400, camcorder 200 or other IR controllable devices. The microprocessor receives user control commands via manual controls, for example, 111, 112, 114, or from a remote control unit, for example IR remote 300, via receiver 106. A data input output connector 129 is provided which allows the user to couple, for example, a personal computer, "lap top" or note book computer to access data, for example, the consolidated calendar or battery charging data. An external PC may also be used to input additional user specific event dates and to construct messages for display.

The control and docking system may be manually operated, however, automated sequence initiation is facilitated based on events stored and accessed by an advantageous calendar algorithm resident in memory 121. The microprocessor maintains a real time clock calendar function which is referenced to a quartz crystal oscillator X1. The real time clock generates both hours, minutes, seconds, and day, month, year, identifying data. The clock may be set manually to synchronize both time of day and the calendar date. However, it is known that such a real time clock may also be synchronized by reception of a suitable broadcast time reference, for example, as broadcast by the Public Broadcasting System.

Figure 5:
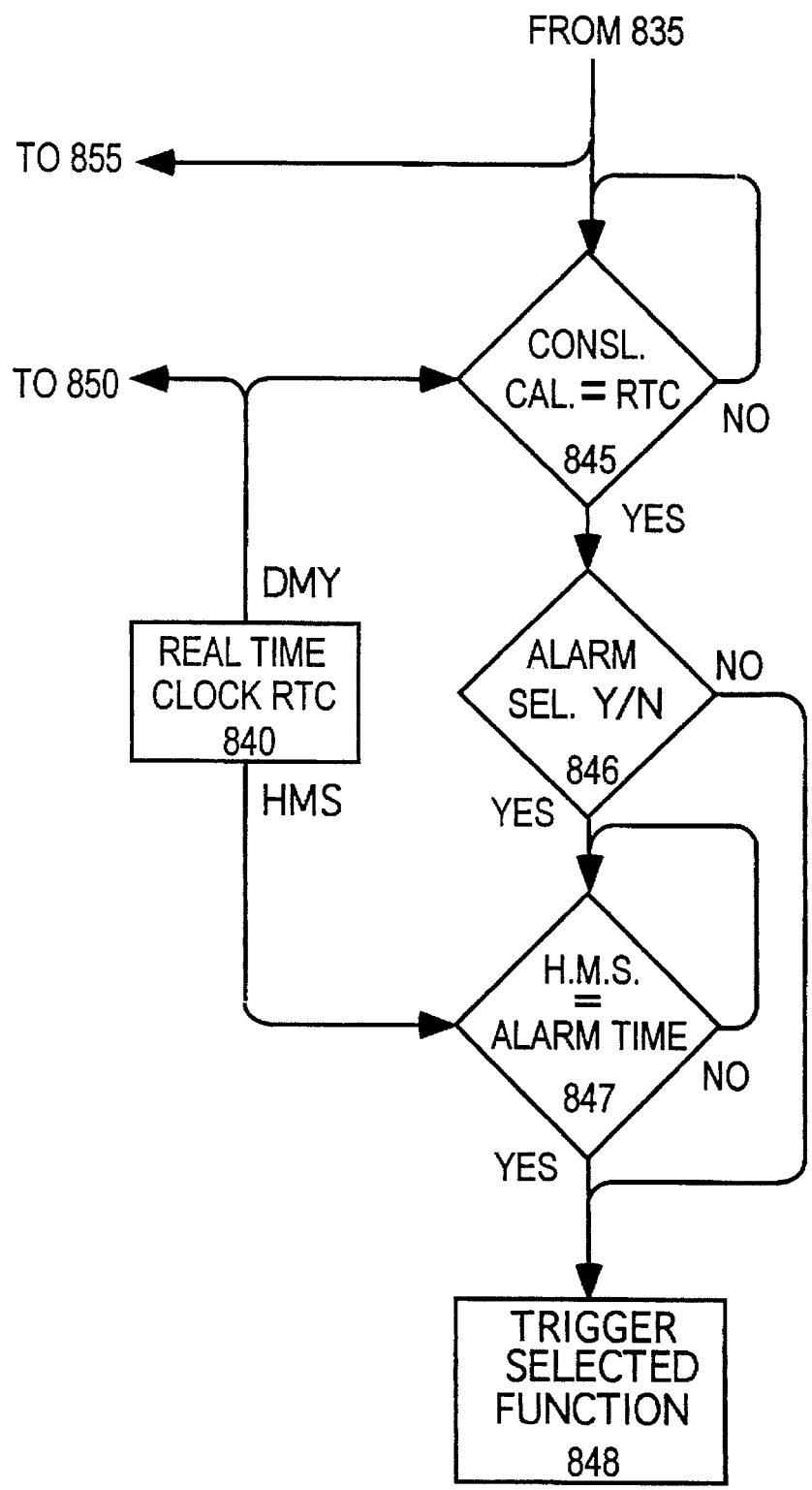
FIG. 5 is a flow chart of a further inventive method.

Memory 121, comprises a factory programmed PROM 124 which contains a plurality of calendars. However, a CD ROM or other data storage medium may be used. The user may make selections from the plurality of calendars and an advantageous method illustrated in FIG. 5 is employed to construct a custom calendar from the choices. For example, the user may select a calendar appropriate to the country of residence. This calendar may, for example, be combined with the calendar of a foreign country. This combination of calendars may be further combined with specific holidays, religious schedules or the like, to produce a custom calendar. Events listed to occur in the custom calendar may be tagged, or annotated to produce specific control sequences. For example, if an overseas calendar has been included in the custom calendar, automated initiation of, for example, battery charging may not be required and may be inhibited on overseas event dates.

Figure 4:
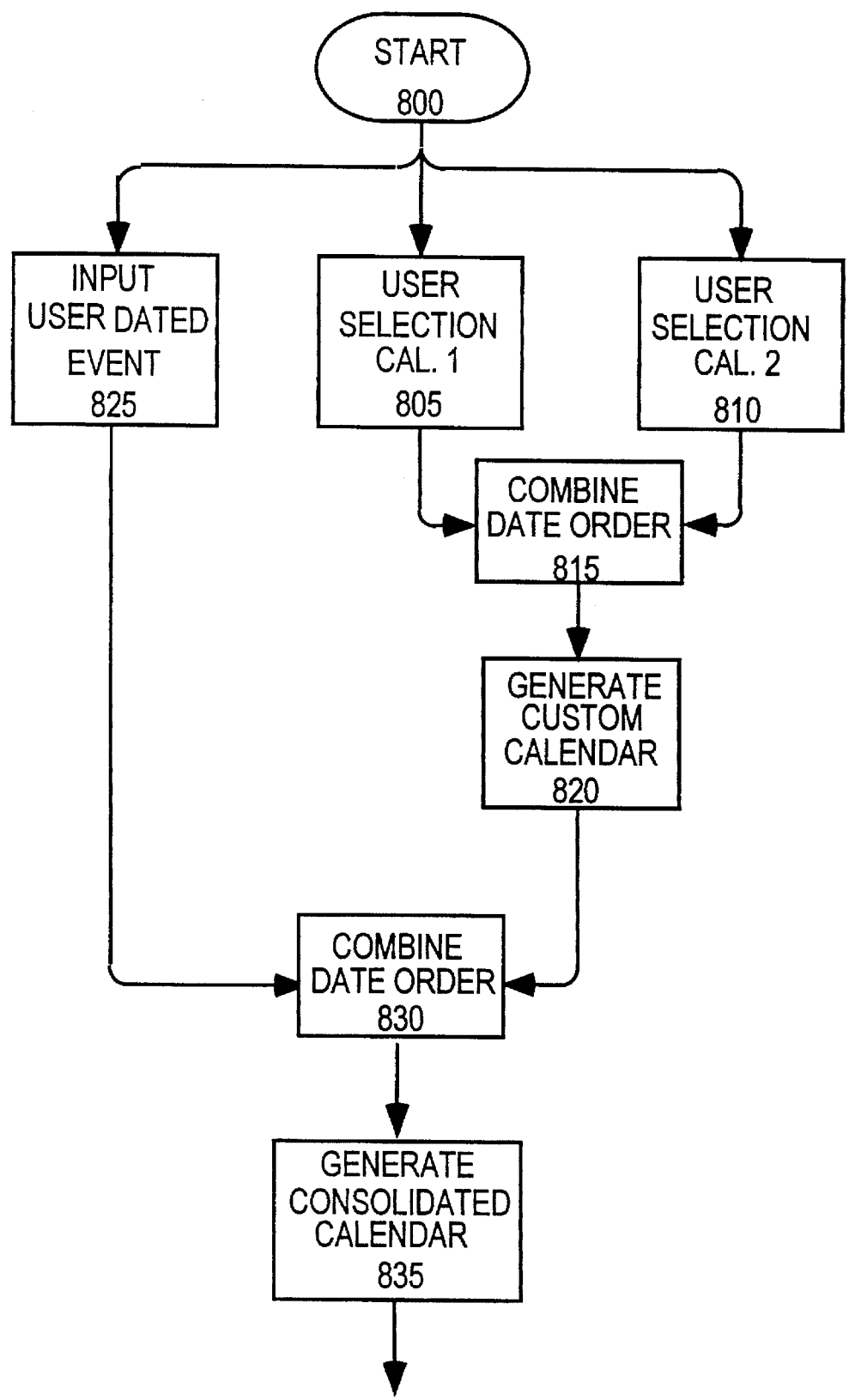
FIG. 4 is a flow chart of an inventive method.

The advantageous control algorithm, illustrated as a flow chart in FIG. 4, is resident in the program storage PROG 123 of memory 121. The control algorithm is executed in conjunction with the real time clock calendar, and initiates control sequences tagged or annotated for each event in custom calendar. For example, the user may select the generation of an on screen display greeting salutation to occur at mid night on New Year's eve, similarly a Christmas greeting may be programmed to occur on Christmas day. Thus, the docking and control system is activated based on custom calendar derived events. However, manual operation may be selected at any time and will over ride any calendar generated occurrences during that day.

In addition to the factory programmed calendars, memory space USER DATA 126, is provided for storage of user entered calendar events such as birthdays, anniversaries and special events. The advantageous method merges the user generated events with the custom calendar to form a consolidated or composite calendar. The algorithm is described with reference to flow chart of FIG. 4.

The operational status of the docking system and components coupled thereto is indicated by display 115. Display 115 is driven by the microprocessor and may also display the internal real time clock calendar or a listing of upcoming consolidated calendar events. An advantageous control algorithm which provides listing of upcoming event is illustrated as a flow chart in FIG. 6. This algorithm is resident in the program storage PROG 123 of memory 121. The user may review the consolidated calendar by periods of, for example, the current month, or the last or next month. The consolidated calendar may also provide weekly event listings of the current, last or next week. A daily event listing may also be displayed for the current day or any day within the calendar. The listing indicates the event name or title and indicates tagged or annotated events. The listing also shows user determined control sequences with activation time, if selected, within the event day. An advantageous control algorithm which generates user determined control sequences with activation time is illustrated as a flow chart in FIG. 5. This algorithm is resident in the program storage PROG 123 of memory 121.

Upon the occurrence of an event, a message is generated for display by display 115. Indicator 107 functions as a message waiting indicator and may be accompanied by a defeatable alerting audible beep. Indicator 107 may indicate an event occurrence message waiting in a first color, for example, green, and a warning message in a second color, for example, red. In addition to detecting the occurrence of consolidated calendar events, the advantageous method may also look ahead or anticipate an event occurrence.

An event occurrence which resulted in the generation of an information message on display 115, may also cause the retrieval of a message stored in PROM. The retrieved message data is coupled for video formatting by an on screen display (OSD) generator 125. The PROM may contain plurality of information messages, including greetings, salutations and warnings. The OSD generator produces a video signal at connector 103 capable of display on a video monitor, and also provides an input signal to RF modulator 130. The RF modulator output is coupled to an antenna amplifier and mixer 135, thus the charger status, docking system warnings, selected messages or salutations may be viewed on television receiver 400. The user may select that camcorder 200 video output be coupled via electronic selector switch 127, to feed the video monitor output .103 and RF modulator 130. The camcorder audio is available at baseband connectors 104 and 105 and is also coupled to the RF modulator.

Electronic selector switch 127 may be embodied as a simple switch or as a multiplying or mixing device. For example, a simple switch embodiment may cause an immediate picture transition between, for example, the on screen display video signal and the camcorder output video signal. In an electronic switch employing a multiplying or mixing device, controllable portions of each input signal are combined to form an output signal responsive to user originated commands coupled via microprocessor 120. In a multiplying or mixing embodiment a gradual image transition may be selected between either video source, for example, a salutation stored in PROM may gradually transition to a video image derived from another video source coupled to the docking system, for example, camcorder, VCR, video disk or demodulated RF TV signal. The multiplying or mixing embodiment may also provide the immediate picture transition produced by the simple switch, since the rate of picture transition is dependent on control signal generated by the microprocessor. For example, a rapid rise time control signal may result in a cut or switch type transition, however a slow or variable rise time control signal may result in a slower picture transition. When utilizing the multiplying or mixing embodiment, a video signal derived from a replay source may require some form of timebase correction to provide synchronism between the PROM generated image and the replay signal. For example the OSD 125 generator may be adjusted to match the replay video signal or alternatively the replay signal may be stabilized prior to switch 127.

Figure 2:
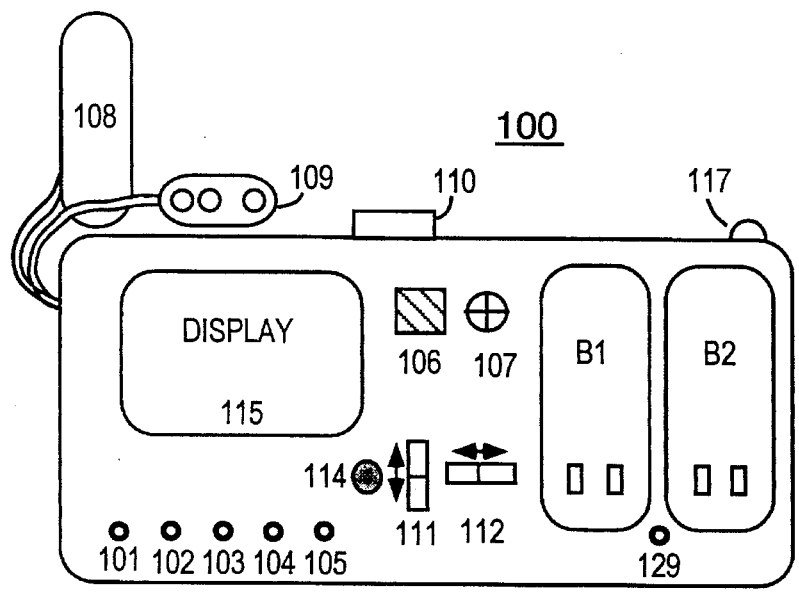
FIG. 2 shows the inventive control and coupling apparatus depicted in FIG. 1.

FIG. 2 illustrates an exemplary control panel for the camcorder coupling and control system 100. The unit may be controlled by manually operated switches which permit control of mode selection by scrolling through various menus displayed by display 115. For example, switches 111 and 112, may be rocker switches having a spring biased center off condition. Pressing in the appropriate arrow direction causes a display cursor to move, or the display to scroll in the selected direction. The desired function may be selected by activate button 114. Similarly the displayed menu of control options may be accessed, scrolled through and selected by IR remote control unit 300 coupled via IR receiver 106. Manual setup and control may also be performed using a personal computer connected via I/O port 129. Information shown on display 115 may also be viewed on a video monitor or TV receiver 400.

Connector 109 provides audio and video connection of camcorder signals for coupling to the monitor video output 103 and audio outputs 104 and 105. The signals are also coupled to RF modulator 130 for TV receiver viewing. Thus, a simple and permanently connected system is provided for camcorder viewing on TV receiver 400. Connector 110 provides both battery charging and camcorder DC power to an appropriately equipped camcorder, thus facilitating the charging of mounted camera batteries. In addition to DC powering, connector 110 provides a data I/O connection which allows camcorder control commands to be input and battery use data to be retrieved from the camcorder, or camcorder mounted battery, for use by microprocessor 120. Connector 110 also couples audio and video as already described.

The consolidated calendar is monitored by the algorithm of FIG. 5 for coincidence between the event date and the real time clock calendar RTC. Upon coincidence, an on time event control signal is generated. Generation of the on time event signal may, for example, be timed to occur at 3.01 AM in the event day thus avoiding possible ambiguities at junctures with daylight saving time. User dated events may be stored with a specific activation time selected for generation or initiation of the desired control function, as illustrated in the flow chart of FIG. 5. A non-timed user event will be executed at a default timing of, for example, 3.01 AM.

Figure 6:
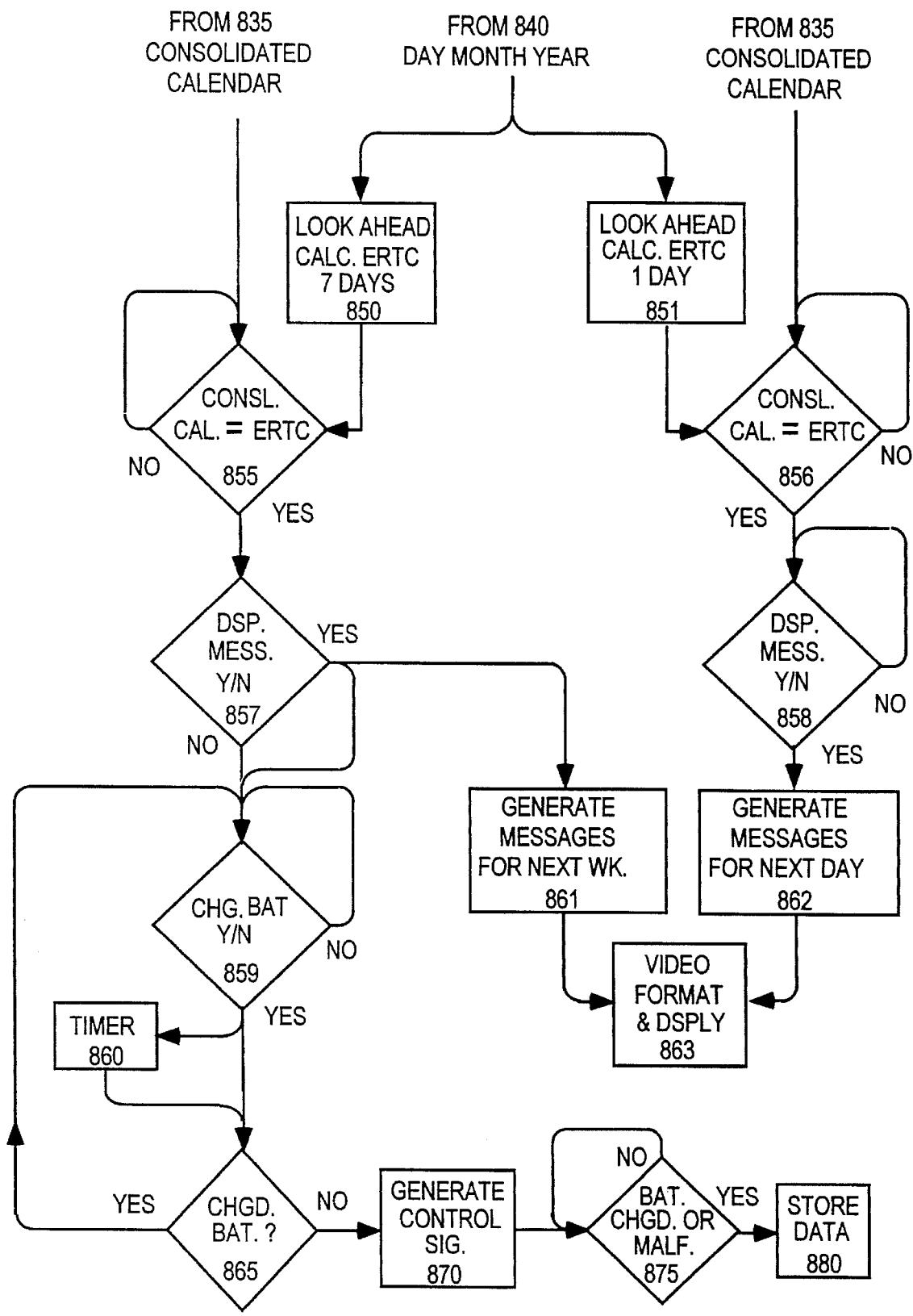
FIG. 6 is a flow chart of another inventive method.

It is advantageous to provide the user with advanced warning of an upcoming event and this anticipation is provided by a look ahead feature in the control algorithm illustrated in the flow chart of FIG. 6. The occurrence of an alerting message may be indicated by the message waiting indicators 107 which may, for example, be pulsed on and off thus enabling the user to distinguish between anticipation and on time messages. The actual event name may be read from the consolidated calendar and may be coupled to OSD generator for video display formatting. For example, such an on screen anticipatory message may indicate "ANNIVERSARY NEXT WEEK", or "ROS'S BIRTHDAY NEXT WEEK". The on screen salutary message may be selected to occur on the event date, for example "HAPPY BIRTHDAY", "HAPPY ANNIVERSARY" etc. These on screen salutations may be selected from various messages stored PROM, of memory 121. However, the user may compose a specific message which may be superimposed over a selected background image obtained from a plurality of image backgrounds stored in PROM. The stored background may, for example, represent a low contrast image to which user generated lettering can be added. Since user generated events may be timed for occurrence within the event day salutations may be generated at a specific time. For example, a happy birthday TV alarm call, or a surprise TV screen greeting may be generated. Clearly such user generated events require that the video display and signal generating source VCR, camcorder, etc., be capable of activation by a docking system control command or commands.

In addition to salutations from PROM and user generated messages, the salutary capability may be associated with stored remote control commands which initiate operation of other devices, for example, the camcorder, VCR, monitor, TV receiver, computer, etc. In an exemplary alarm call situation, a TV receiver must be activated and the appropriate input signal selected prior to or coincident with the generation of the salutation or initiation of camcorder replay. The advantageous alarm clock may be used to initiate recording by the camcorder or to control other devices capable of remote control, for example, by IR transmitter 117. The generation of alerting or salutary displays and the control of remote devices are user selectable. However, warnings may not be defeated and are always indicated by message waiting indicator 107 and display 115.

FIG. 4 illustrates in flow chart form, parts of the advantageous method which allow the user to construct personalized calendars. As described, the user may make selections from the plurality of calendars and construct a custom calendar from the choices. The custom calendar may be personalized by the addition of user dated events. The flow chart of FIG. 4 illustrates parts of the advantageous method which allow the user to enter specific event dates with names and control selections. This user specific data is advantageously combined with the custom calendar to generate a consolidated or composite calendar. FIG. 5 illustrates in flow chart form, parts of the advantageous method where the consolidated calendar is compared for coincidence with day, month, year, (DMY) data generated by the real time clock (RTC). An event may also be timed for occurrence at a specific time on the specific day. The real time clock (RTC) generates hours minutes and seconds data which is utilized by the algorithm to detect coincidence with the desired time. Upon coincidence, an "on time" or event occurrence signal is generated and the user determined function is activated.

The occurrence of consolidated calendar events may be advantageously anticipated by the method illustrated in the flow chart of FIG. 6. FIG. 6 depicts two anticipation or look ahead periods, having predetermined default settings of 1 and 7 days, respectively. These anticipation periods are user definable. The look ahead function may be achieved by a calculation, which generates a modified or early real time clock, or by a similar calculation which generates an early version of the consolidated calendar. FIG. 6 illustrates event anticipation by generation of modified, or early real time clock calendars (ERTC). Upon coincidence with ERTC, the anticipated event data is tested to determine the presence of a display request, for example, a 7 day look ahead of upcoming events, or an alerting message warning of a personal event occurrence on the following day. An alerting message may result in the generation of an on screen display stating, for example, "ANNIVERSARY TOMORROW". In the 7 day look ahead flow chart path the anticipated event data is tested to determine the presence of a battery charging requirement. The 7 day look ahead defaults to generation of a charging command unless specifically inhibited by the user. To prevent battery damage in the event that the battery is already charged, the algorithm tests the battery condition and inhibits charging. If the battery is not charged, charging is initiated in anticipation of the yet to occur event.

The flow chart illustrated in FIG. 4 starts step 800 where the user may make selections form various calendars, or input user specific data. At step 805 selections may be made from a first preprogrammed calendar of named events. Similarly at step 810 the user may select events from a second preprogrammed events calendar. Further preprogrammed event calendars, for example, calendars for foreign countries or specific religious organizations etc., not illustrated for simplicity, may be provided for user selection. These user selected calendars and parts thereof, are combined in date order at step 815 and generate at step 820 the users custom calendar.

At step 825 the user may enter specific calendar dated events, together with event names, and control functions. Such control functions may represent, for example, selecting or generating a salutary graphical caption, or generating a remote control command to turn on a TV receiver to permit viewing, or determining a specific time for TV or VCR activation to provide a TV alarm call. These user events are merged, or combined, with the custom calendar at step 830. The result of step 830 is the generation at step 835 of a consolidated calendar. Thus the consolidated calendar represents the amalgamation of the various user selections from the pre-programmed calendars together with the users own specific event dates.

The consolidated calendar of step 835 is tested at step 845 of flow chart FIG. 5, for equality to, or coincidence with day month year (DMY) data from real time clock (RTC) at step 840. If test 845 is NO the consolidated calendar event has not occurred and the test condition is looped back to test coincidence at the next increment of the DMY data from RTC 840. If there is coincidence at test 845, YES is generated which results in a further test at step 846. Step 846 tests for a user determined activation time or alarm time. A NO at step 846 results in generation of an activation trigger of the user selected function at step 848. If step 846 tests YES, coincidence is tested for at step 847, between the user determined activation time and the RTC hours, minutes and seconds data. When there is coincidence a YES is produced at step 847 which results in the generation of an on time event or activation trigger of the user selected function at step 848.

Event anticipation or "look ahead" is advantageously provided by the method illustrated in FIG. 6. Real time clock DMY data is processed to calculate a 1 day advanced or early real time clock, ERTC1, at step 851. The 1 day ERTC1 is tested at step 856 for coincidence with consolidated calendar data from step 835. A NO at step 856 causes the method to loop back and wait for the next increment. Coincidence at step 856 generates YES which results in testing at step 858 to determine if a message is to be displayed. A NO at step 858 causes the method to loop back and wait. If step 858 is YES, the user determined message is generated at step 862 and formatted for video display at step 863. Such a message may represent an alerting message indicating an imminent event, for example, "ANNIVERSARY TOMORROW", or "BIRTHDAY TOMORROW". Other messages may result from a request for a listing of the events the next day.

Real time clock DMY data is also processed at step 850 to calculate a 7 day advanced or early real time clock, ERTC7. The ERTC7 is tested at step 855 for coincidence with consolidated calendar data from step 835. A NO at step 855 indicates that an anticipated event has not occurred and causes the method to loop back and wait. Coincidence at step 856 generates YES which results in testing at step 857 to determine if a message is to be displayed. A YES at step 857 generates the user determined message at step 861 which is formatted for video display at step 863. Messages may represent an alerting message indicating a forth coming event, for example, "ANNIVERSARY NEXT WEEK", or "BUY BIRTHDAY CARD", "DINNER WITH BOSS". Other messages may result from a calendar listing request.

If test 857 is YES or NO, step 859 tests for a user generated charging inhibit, since every 7 day anticipated event defaults to charge initiation. A NO at step 859 causes the method to loop back and wait. A YES at step 859 results in restarting a timer at step 860. The timer at step 860 has a period, for example, of 4 weeks duration. Upon expiration of the exemplary 4 week period, the timer generates an input to test step 865. Thus, during periods without anticipated event activity the timer provides charge initiation, via steps 865 and 870, correcting self discharge effects in a battery connected for charging. A YES at step 859, in addition restarting the timing period of step 860 also tests the battery for a charged condition at step 865. If the battery is charged, step 865 tests YES and the test condition is looped back to wait. Thus a YES at step 865 adapts or inhibits calendar generated charging to avoid possible battery life shortening consequences of overcharging.

If step 865 tests NO the battery is not charged and a control signal is generated at step 870. The control signal may be utilized to initiate battery charging. Following generation of the control signal, a test is performed at step 875 which tests for a charged battery condition or for the occurrence of a charger or battery malfunction. If step 875 tests NO, the test is looped back to the input of step 875. However when step 875 tests YES, data is stored, for example, data relating to battery type and identification, charge status of battery and status of the charger. In addition to data relating to battery and charger status a cumulative total of charges and rejuvenations is also stored and updated. Thus a history is established for each battery charged.

Figure 7A:
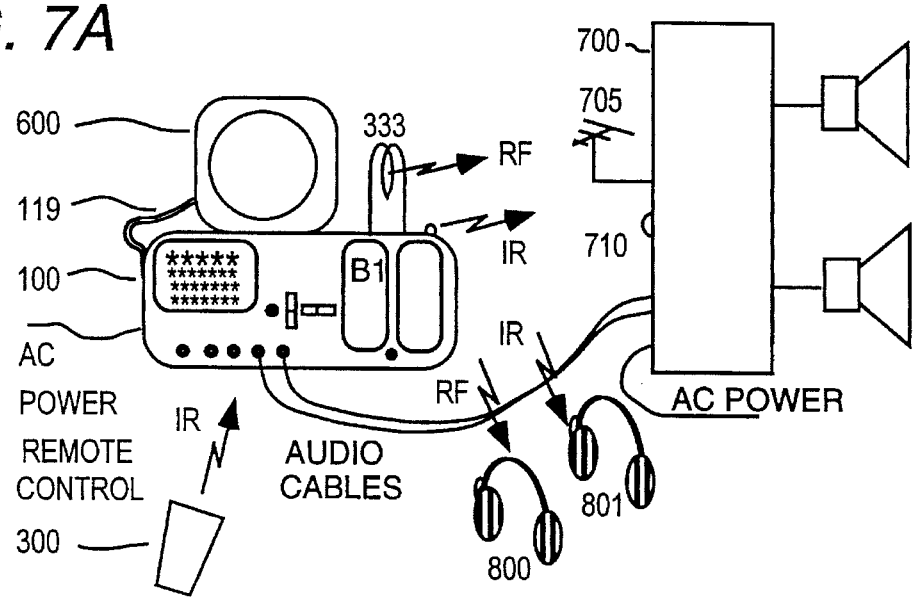
FIGS. 7A and B depict a further coupling system according to an inventive arrangement.

FIG. 7A shows an further embodiment of the inventive docking unit which provides coupling of power and output signals from an audio reproduction device, for example, a compact disc player. The functions provided by apparatus 100 are essentially as described thus only the differences between this and the former embodiment will be described. In FIG. 7A an exemplary compact disc player CD 600 is powered via connector 119 from a DC supply generated within the control and docking unit 100. Output signals from CD player 600 are coupled via connector 150, not shown in FIG. 7A. If the CD player is capable of remote control, such control commands may be coupled via connector 140 or via IR signals from either remote control 300 or IR transmitter 117. The replay signals, for example audio left and right channels may be coupled to baseband output connectors 104 and 105 for cable connection to an audio amplification system 700.

Alternative methods which avoid the use of interconnecting cables, may be employed for coupling to audio system 700. For example, the audio signals may modulate a low power radio frequency (RF) transmitter 330 which is radiated by antenna 333. The transmission is received by antenna 705, which is coupled to an appropriate receiver associated within audio system 700. Low power transmitter 330 may employ frequency modulation at a carrier frequency within a broadcast frequency band thus facilitating the use of an FM receiver within, or associated, with audio system 700. Other transmission frequencies and modulation methods are possible however these would require a receiver specific thereto. The use of RF transmission, although of low power level to preclude radiation beyond the user's building, may provide receivable audio replay signals within the building on other suitable receivers. A wireless head set 802 is depicted in FIG. 7A and may provide reception of RF modulated CD audio transmissions. A further method of a wireless connection to audio system 700 may employ modulation of an infrared (IR) transmitter 350. The modulated IR signal is received by IR receiver 710 which forms part of audio system 700. In addition such an IR modulated audio signal may, for example, be received by an IR wireless head set 801 of FIG. 7A.

Figure 7B:
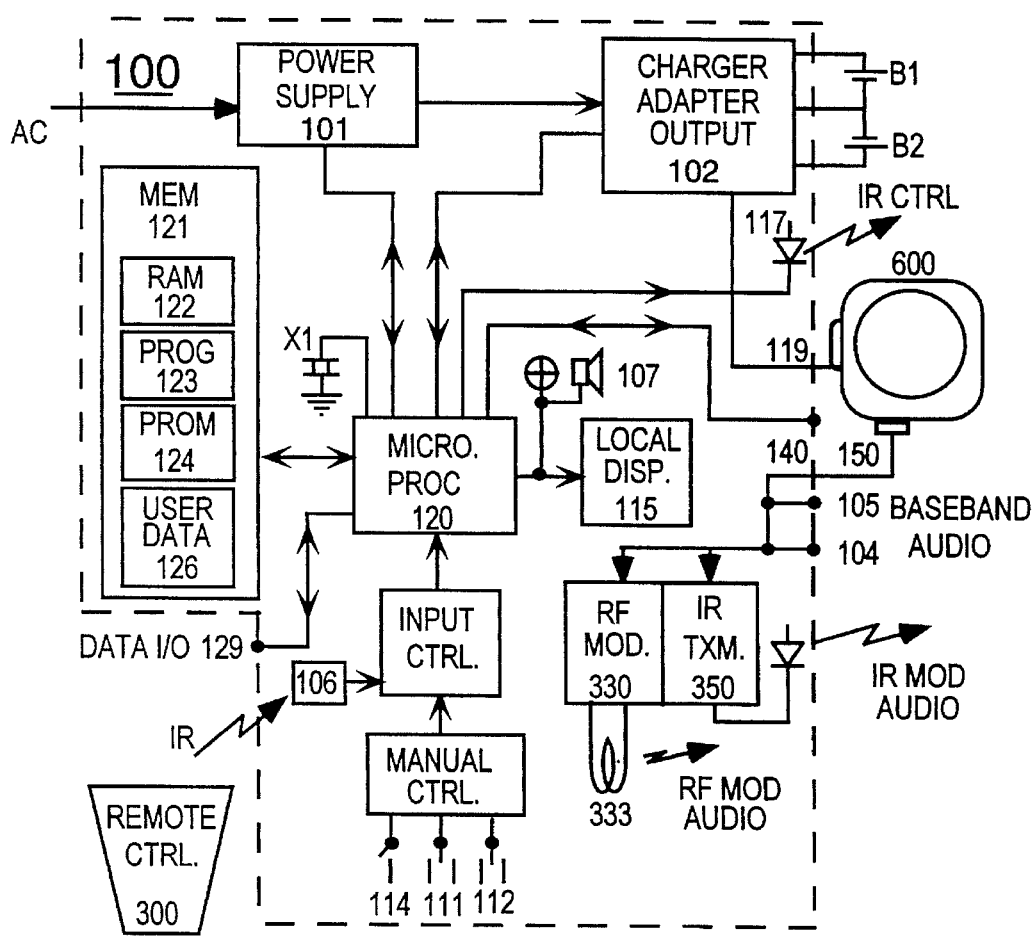

FIG. 7B illustrates major functional blocks associated with the system depicted in FIG. 7A. The functions depicted by the blocks of apparatus 100 are essentially as described for FIG. 3 hence only the differences will be described. Audio output signals from the exemplary CD player 600 are coupled via connector 150 for baseband signal output at connectors 104 and 105. In addition the audio signals may be coupled to modulate a radio frequency (RF) transmitter 330 or an IR transmitter 350 as described in FIG. 7A.

Figure 8:
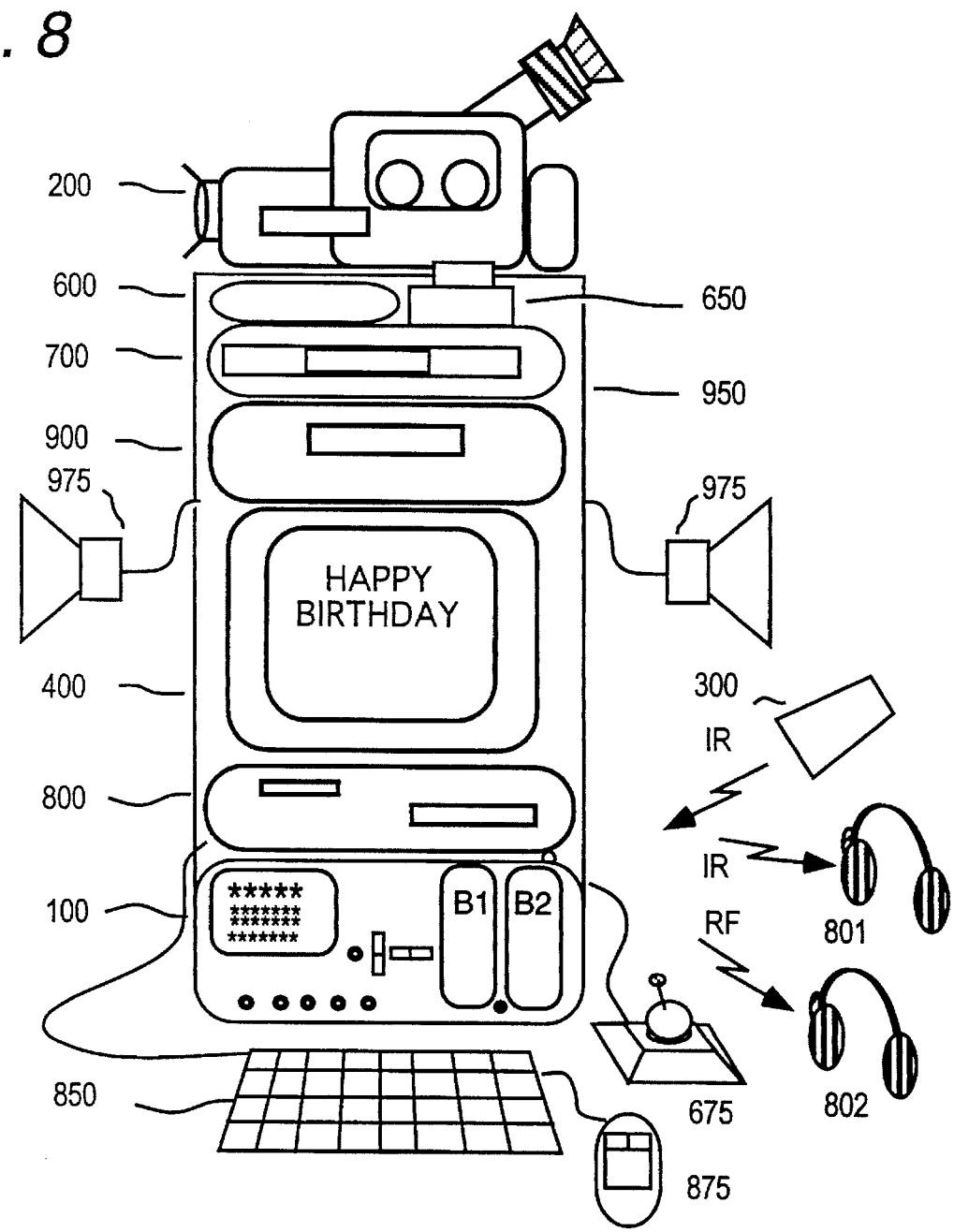
FIG. 8 depicts a further inventive coupling arrangement.

FIG. 8 illustrates a further inventive control and docking embodiment, where control unit 100 is part of a multiple docking and powering assembly 950. In FIG. 8, a docking and powering tower is illustrated, however the advantageous powering and control capability of control unit 100 is not limited to the mechanical form factor of the embodiment illustrated. The embodiment of FIG. 8 represents a compact and possibly cost reduced home entertainment system. The system permits the user to couple together a selection of portable units. Savings may result by powering all the docked units from a single AC power supply. Signal coupling may be simplified with signal selection controlled electronically. A distributed switching matrix is envisioned where audio and video signals are routed to and from respective signal inputs and outputs. Docked equipment may be coupled via a coupling nodes which provide equipment specific connectors. In addition each node will provide the necessary interface circuitry for battery charging and control signaling, with control signals derived from a control data bus coupling the various nodes. Various automated features may be provided, for example, a video calendar with look ahead, a calendar generated salutation, video alarm clock, automated recording and video editing. In addition the advantageous automated battery charging feature of control unit 100 may be utilized to charge and rejuvenate the batteries in the various docked portable units.

Assembly 950 provides mechanical housing and coupling of power, input/output signals and control signals to various units of dockable equipment. The component numbering and functions are as described previously and will be described briefly. The data in/out port 129 of unit 100 (shown in FIGS. 3 and 7B) is utilized by a personal computer 800. The computer may comprise a CD ROM player which may provide both still and moving image data from which video signals may be generated. Keyboard 850 and mouse 875 are coupled to computer 800. The personal computer permits simplified and rapid control and manipulation of the various controllable features resident in unit 100. Television receiver 400 is docked both mechanically and electrically within assembly 950 and provides TV monitoring of the various automated features formatted as video signals. Alternatively TV 400 may be replaced by a video display to provide monitoring. A video cassette recorder, VCR 900, may be mounted and coupled to assembly 950 to provide controllable video signal recording and replay for display on receiver 400. Video cassette recorder 900 may be controlled responsive to commands from unit 100 or from IR remote 300. The audio system 700 of FIG. 7A is also docked mechanically and electrically with assembly 950 and provides audio output signals which are coupled directly to loudspeakers 975, or via wireless, IR or RF modulated carriers to head sets 801 and 802 respectively. A video game 650 may be coupled to docking and powering assembly 950 with a video output coupled via unit 100 for display on TV receiver 400. The game may be controlled by control 675, for example, a joy stick 675. Assembly 950 also facilitates the mounting and coupling of a audio CD player 600 to audio system 700 and the respective wireless audio transmission systems. The camcorder 200 may be docked and coupled via assembly 950 to provide both live and recorded video signals controlled by unit 100 as described previously.

What is claimed is:

1. A docking apparatus for an electronic entertainment device, said apparatus comprising:

a video display;

memory blocks for storing calendar data, calendar dated event data, display message data and a control algorithm;

a microprocessor for executing said algorithm and accessing said memory blocks, and responsive to an occurrence of said calendar dated event, generating a display message signal; and, a video signal formatter for generating a first video display signal responsive to said display message signal and including a controllable selector for selectively coupling one of said first video display signal and a second video signal from an entertainment device, when docked, to said video display.

2. The docking apparatus of claim 1, wherein said calendar dated event additionally contains control instructions.

3. The docking apparatus of claim 2, wherein said control instructions are executed by said microprocessor upon said occurrence of said calendar dated event.

4. The docking apparatus of claim 2, wherein said control instructions include a specific time for execution of said control instructions upon said occurrence of said calendar dated event.

5. The docking apparatus of claim 3, wherein said control instructions generate a control signal for activating said electronic entertainment device when docked in said apparatus.

6. The docking apparatus of claim 5, wherein said electronic entertainment device, when docked, generates said second video signal responsive to said control instructions.

7. The docking apparatus of claim 1, wherein said video signal formatter additionally couples a video signal for recording by said electronic entertainment device when docked in said apparatus.

8. The docking apparatus of claim 7, wherein said calendar dated event control instructions additionally select an operating mode for said electronic entertainment device when docked.

9. The docking apparatus of claim 1, further comprising a power supply adapted for connection to said electronic entertainment device when docked and generating a current for powering thereof.

10. A calendar controlled display apparatus comprising:

a video display;

a video formatting circuit having an output coupled to said video display;

memory blocks for storing a first data set indicative of at least one preprogrammed calendar event and a second data set indicative of at least one user specific calendar event; and, means for executing an algorithm for combining said first and second data sets to form a custom calendar, and upon an occurrence of an event from said custom calendar, activating an alerting indicator and generating an event display message for video formatting by said video formatting circuit.

11. The calendar controlled apparatus of claim 10, wherein said algorithm, executed by said means, anticipates an occurrence of one of said preprogrammed calendar and said user specific calendar events, said means generating a control signal a predetermined time in advance of said occurrence.

12. The calendar controlled apparatus of claim 11, wherein said second control signal generates a second display message from a plurality stored in said memory block.

13. The calendar controlled apparatus of claim 11, wherein responsive to said second control signal said indicator is cycled between on and off states.

14. A calendar controlled display apparatus comprising:

a video display;

a video formatting circuit having an output coupled to said video display;

memory blocks for storing a first data set indicative of a specific calendar event, a second data set indicative of user specific calendar event data and a plurality of display messages;

means for executing an algorithm for combining said first and second data sets to form a custom calendar, and at an occurrence of an event from said custom calendar, said means generating a first control signal coupled to activate an event display message from said plurality of display messages for coupling to said video display; and, said algorithm anticipating an occurrence of an event from said custom calendar, and said means generating a second control signal a predetermined time in advance of said custom calendar event, said second control signal activating a second display message from said plurality of display messages.

* * * * *